(12) United States Patent
Nishiie (10) Patent No.: US 7,889,376 B2
(45) Date of Patent: Feb. 15, 2011

(54) ELECTRONIC BLACKBOARD

(75) Inventor: Toru Nishiie, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 647 days.

(21) Appl. No.: 11/893,278

(22) Filed: Aug. 15, 2007

(65) Prior Publication Data

US 2008/0049265 A1    Feb. 28, 2008

(30) Foreign Application Priority Data

Aug. 28, 2006   (JP)   ............... 2006-230699

(51) Int. Cl.
  G06F 3/12   (2006.01)
  G06F 3/033  (2006.01)
  G06F 3/041  (2006.01)
  G09G 5/00   (2006.01)

(52) U.S. Cl. ............... 358/1.15; 358/1.1; 345/156; 345/173; 345/179

(58) Field of Classification Search ............. 358/471, 358/1.16, 1.1, 1.15; 345/173, 156, 174, 179, 345/586, 733, 740; 347/2; 709/208, 204
See application file for complete search history.

(56) References Cited

U.S. PATENT DOCUMENTS

| 6,724,373 | B1 * | 4/2004 | O'Neill et al. ............... 345/179 |
| 6,778,167 | B2 * | 8/2004 | Ohashi ....................... 345/173 |
| 2007/0279593 | A1 * | 12/2007 | Li et al. ....................... 353/22 |

FOREIGN PATENT DOCUMENTS

| CN | 2342394 Y | 10/1999 |
| JP | 2004-15619 A | 1/2004 |
| JP | 2006-12040 A | 1/2006 |

OTHER PUBLICATIONS

Chinese Office Action dated Sep. 19, 2008, issued in a counterpart Chinese Application.

* cited by examiner

*Primary Examiner*—Charlotte M Baker
(74) *Attorney, Agent, or Firm*—Patterson & Sheridan, LLP (57) ABSTRACT

A writing medium includes a board surface on which drawing is executed. A reader reads a drawing object drawn on the writing medium. A power supply switch is located at a front side of an electronic blackboard to execute an on/off operation of the electronic blackboard. A data port is located right above the power supply switch to output the read drawing data to a removable exterior storage medium.

20 Claims, 6 Drawing Sheets

ELECTRONIC BLACKBOARD

CROSS REFERENCE TO RELATED APPLICATION

The present application is based on Japanese Priority Document P2006-230699 filed on Aug. 28, 2006, the content of which is incorporated herein by reference.

BACKGROUND OF THE INVENTION

1. Field of the Invention

The present invention relates to an electronic blackboard, especially, relates to an electronic blackboard which has a writing medium having a board surface on which a drawing object such as a letter, a diagram or the like can be drawn, a reader for reading the drawing object on the writing medium, and a data port for outputting the read drawing data to a removable exterior storage medium.

2. Discussion of Related Art

Figure 8:
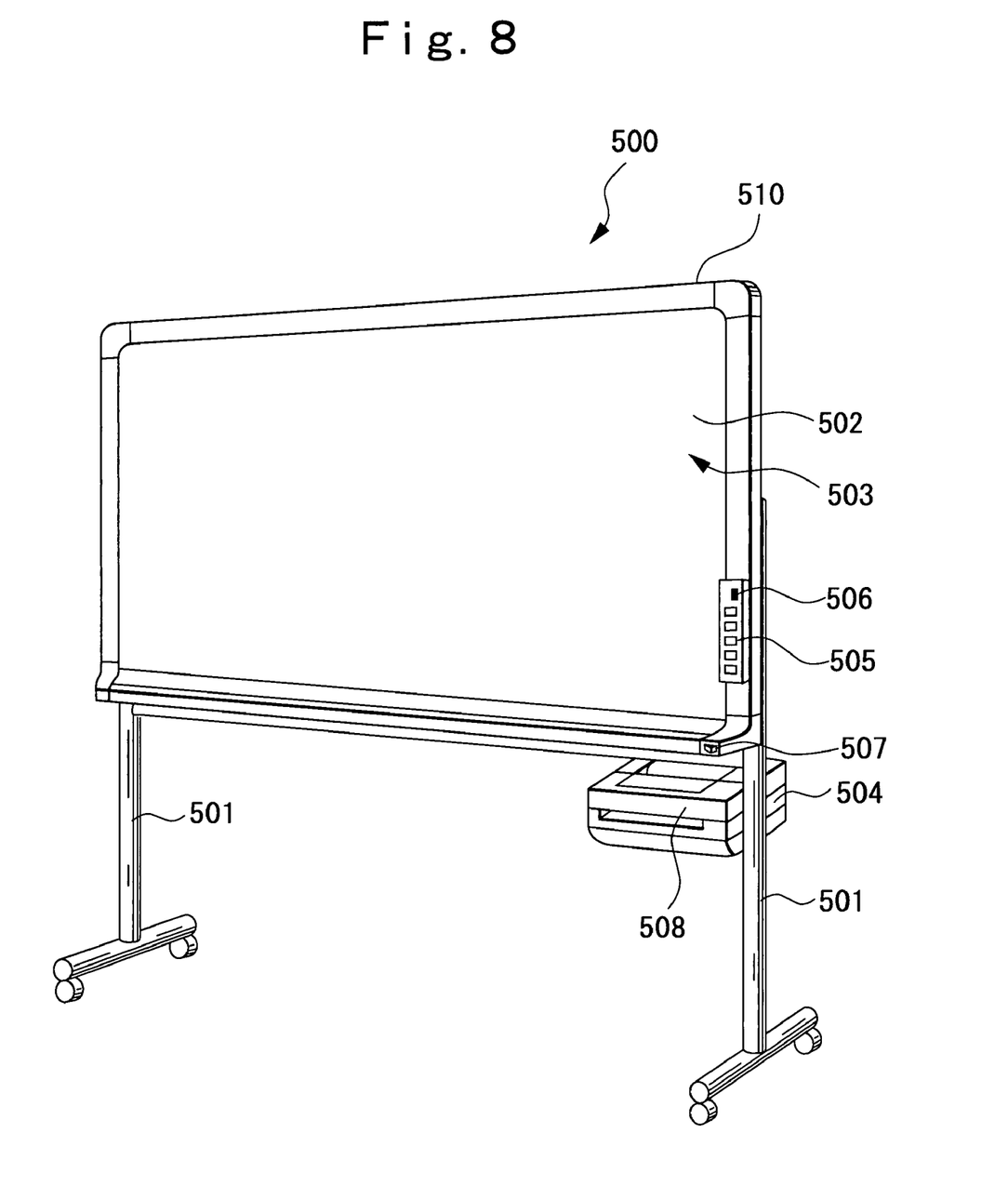
FIG. 8 is a perspective view showing a conventional electronic blackboard.

There is an electronic blackboard, which stores a drawing object such as a letter, a diagram or the like drawn on a writing surface as drawing data into an exterior memory. FIG. 8 shows a perspective view showing a conventional electronic blackboard. The electronic blackboard 500 has a rectangular frame 510 supported by a stand 501, at which an endless-type sheet member 502 is arranged. The sheet member 502 forms a writing surface 503, on which a drawing object such as a letter, a diagram or the like is drawn, at a front opening of the frame 510. The electronic blackboard 500 has an optical reader (not shown) for optically reading the drawing object drawn on the sheet member 502 and for outputting drawing data corresponding to the read drawing object. With the optical reader, the drawing object such as a letter, a diagram or the like drawn on the sheet member 502 can be printed out to a paper by a printer 504. Further, while the electronic blackboard 500 prints out by the printer 504 the drawing object such as a letter, a diagram or the like read by the optical reader, the electronic blackboard 500 stores the drawing data to an exterior memory such as a USB (Universal Serial Bus) memory or the like. Conventionally, there is a printer 504 which provides a USB port 508 at a front side thereof.

Japanese Laid Open Publication No. 2004-15619 discloses an electronic blackboard which includes a sheet member on which a drawing object such as a letter, a diagram or the like are drawn, an optical reader for optically reading the drawing object drawn on the sheet member and for outputting drawing data corresponding to the read drawing object, a memory for storing the drawing data outputted from the optical reader, and an output part for providing an output corresponding to the drawing object based on the drawing data stored in the memory, wherein the output part includes a multipurpose exterior storage medium removably connected thereto, and the exterior storage medium stores image data as the output.

Also, Japanese Laid Open Publication No. 2006-12040 discloses an information processing system in which a USB terminal is adaptable as the output part and a USB memory is usable as the exterior storage medium.

According to the conventional electronic blackboard described above, a located position of the USB port, to which the USB memory as the exterior memory is connected, is provided at a position near a printer, for example, where the drawing data is taken in easily. Therefore, it is not always convenient for usage of the USB memory.

That is, the position of the USB port is not recognized at a glance when the USB memory is inserted, and the inserted USB memory is often forgotten to be removed from the USB port after use of the electronic blackboard.

SUMMARY OF THE INVENTION

Accordingly, an object of the present invention is to provide an electronic blackboard, which enables a connection port of an exterior memory such as a USB memory or the like to be recognized clearly, and which prevents the connected exterior memory from being forgotten to be removed.

To achieve the object of the present invention, an electronic blackboard of the prevent invention is provided which includes: (i) a writing medium including a board surface on which a drawing is executed, (ii) a reader for reading a drawing object drawn on the writing medium, (iii) a power supply switch located at a front surface side of the electronic blackboard, for executing an on/off operation of the electronic blackboard, and (iv) a data port located right above the electronic power supply switch, for outputting a read drawing data into a removable exterior storage medium.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention will be described with reference to FIGS. 1 to 7.

Figure 1:
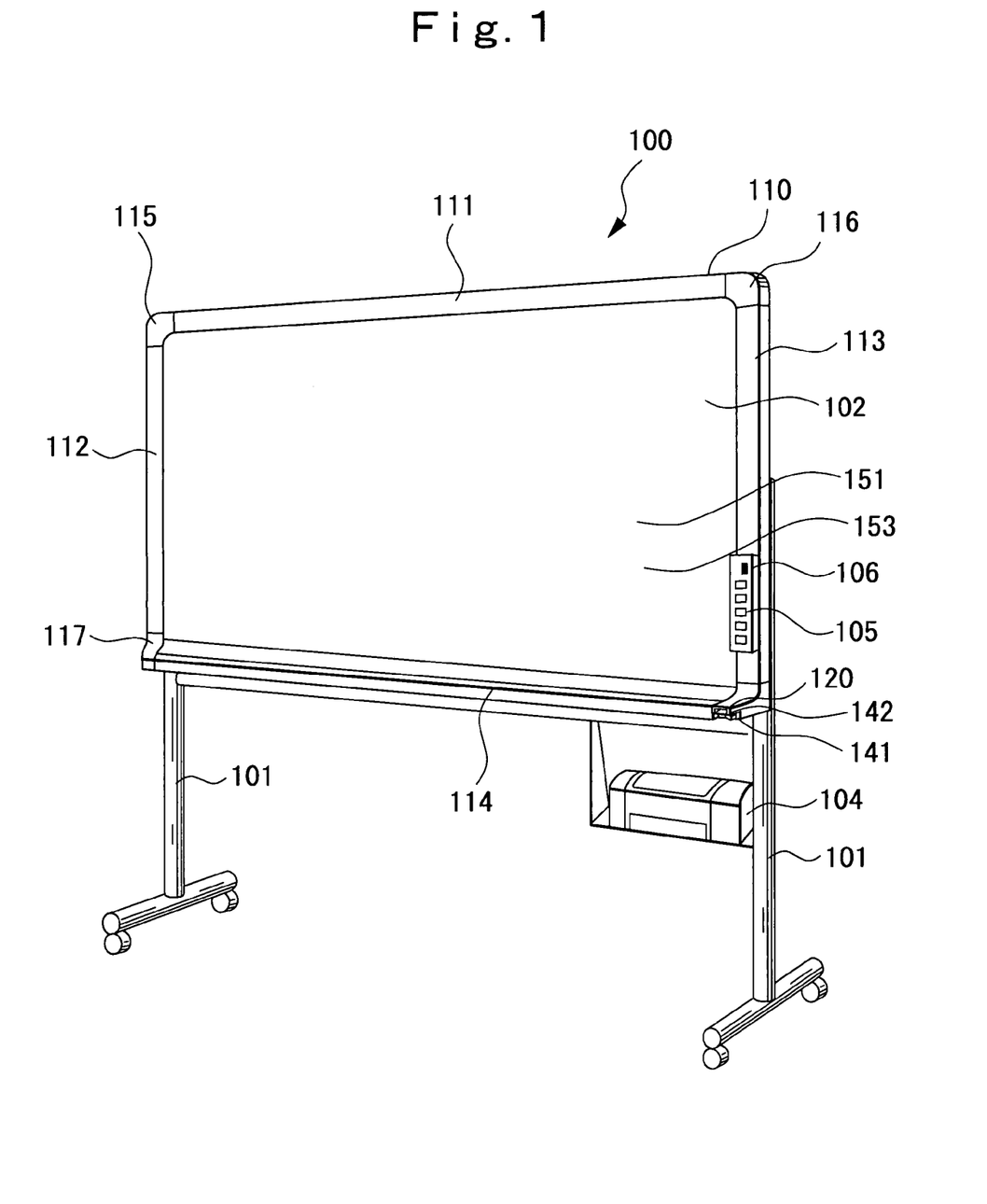
FIG. 1 is a perspective view showing an electronic blackboard with respect to an embodiment of the present invention.

FIG. 1 is a perspective view showing an electronic blackboard with respect to the embodiment of the present invention. The electronic blackboard 100 has a rectangular frame 110, which is supported by a pair of stands 101 and 101. The frame 110 houses an endless-type writing screen 102. A part of the screen 102, which is exposed from an opening part of a front side of the frame 110, is a writing surface 103 as a board surface on which a drawing object such as a letter, a diagram or the like is drawn. A polyethylene screen is adopted as the screen 102, for example. A printer 104 for printing and issuing a drawing object, which has been read by a CCD line sensor 304 (see FIGS. 2 and 3), on a paper (not shown) is provided at a right bottom of the frame 110.

The frame 110 has an upper peripheral part 111 located at an upper part of the writing surface 103, a left side peripheral part 112 and a right side peripheral part 113 located at both sides of the writing surface 103, and a bottom platform 114 located at a bottom part of the writing surface 103 and protruded into a front direction.

The upper peripheral part 111, and the left side peripheral part 112 and the right side peripheral part 113 are connected via a left side corner member 115 and a right side corner member 116 located at both sides of the upper peripheral part 111. The bottom platform 114 is connected to the left side peripheral part 112 and the right side peripheral part 113 via a left bottom side corner member 117 and a right bottom side corner member 120 located at bottom part of the left side peripheral part 112 and the right side peripheral part 113, respectively.

The bottom platform 114 is protrudedly formed at a more front position than the writing surface 103, and a maker pen and an eraser can be placed thereon. Moreover, the bottom platform 114 has a function for catching an ink scum, which occurs when a drawing object on the writing surface 103 is erased by the eraser.

An operation panel 106 having various keys 105 for operating the electronic blackboard 100 is integrally provided at the right side peripheral part 113 of the frame 110.

A power supply switch 141 for executing an on/off operation of the electronic blackboard 100 and a USB port 142 as a data port, to which a USB memory is connected, are arranged at the right bottom side corner member 120.

That is, the power supply switch 141 is arranged at a front side of the electronic blackboard 100 and the USB port 142 is located right above the power supply switch 141.

Figure 2:
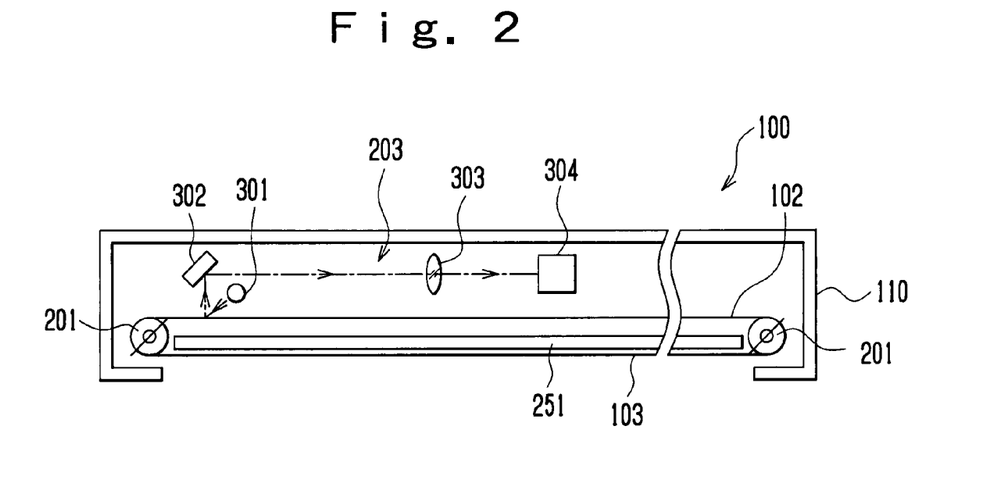
FIG. 2 is a plane view schematically showing an internal structure of the electronic blackboard.
Figure 3:
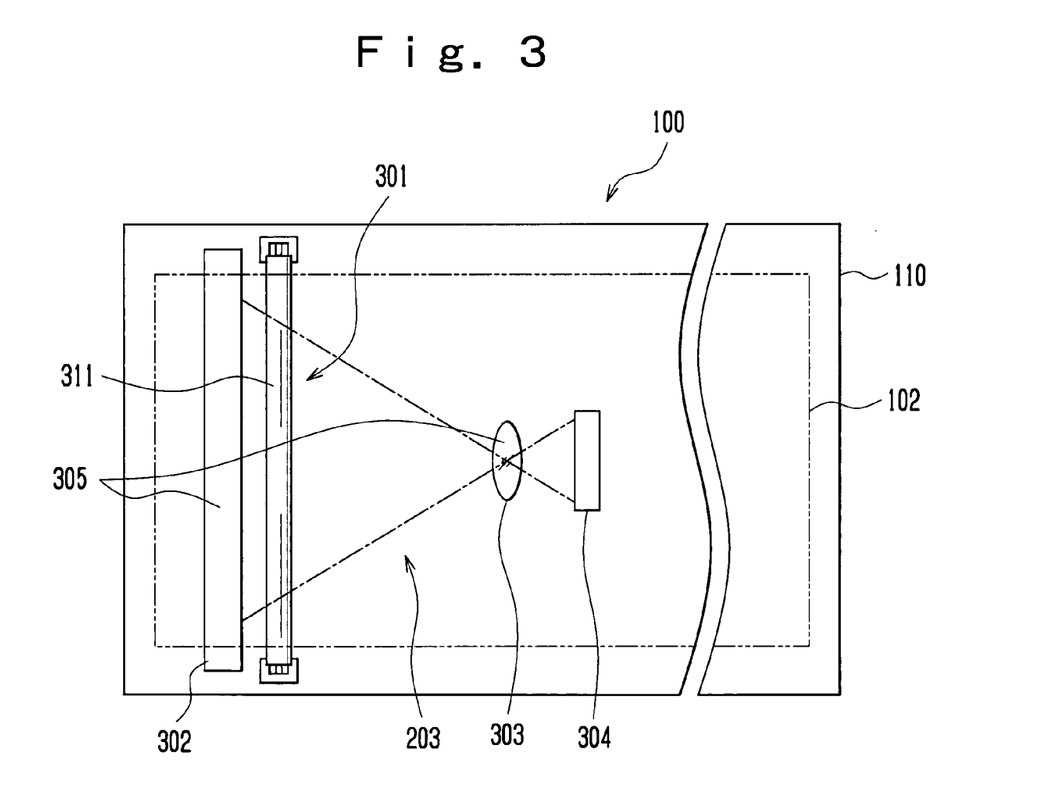
FIG. 3 is a front view schematically showing an internal part of the electronic blackboard.

FIG. 2 is a plane view schematically showing an internal structure of the electronic blackboard. FIG. 3 is a front view schematically showing an internal part of the electronic blackboard.

A pair of rollers 201 for rolling and conveying the screen 102 is provided at right and left end parts within the frame 110. The rollers 201 have a core shaft in an up and down direction. The endless-type screen 102 is stretched over the pair of rollers 201. A motor 202 (see FIG. 4) is connected to one of the rollers 102 via a belt transmission mechanism (not shown). When the motor 202 drives, the rollers 201 are rolled via the belt transmission mechanism. The screen 102 is rolled and conveyed in the right and left direction by a rotation of the rollers 102.

A writing board 251 for ensuring writability with respect to the writing surface 103 is provided just behind the writing surface 103 of the screen 102.

A reader 203 for reading a drawing object such as a letter, a diagram or the like drawn on the writing surface 103 as drawing data is provided at an opposite side of the writing surface 103 of the screen 102 (hereinafter, it is called as a back surface side of the screen 102). The reader 203 has a light source 301 for emitting a light to the screen 102. The light source 301 includes a fluorescent light 311 and is located at the back surface side of the screen 102 and is located at one of the rollers 201.

The electronic blackboard 100 has a mirror 302 and a lens 303 as a part of the reader 203. Further, the electronic blackboard 100 has an optical system 305 as a reduction optical system for collecting a light emitted from the light source 301 and reflected by the screen 102, and a CCD line sensor 304 for receiving the collected light by the optical system 305.

Figure 4:
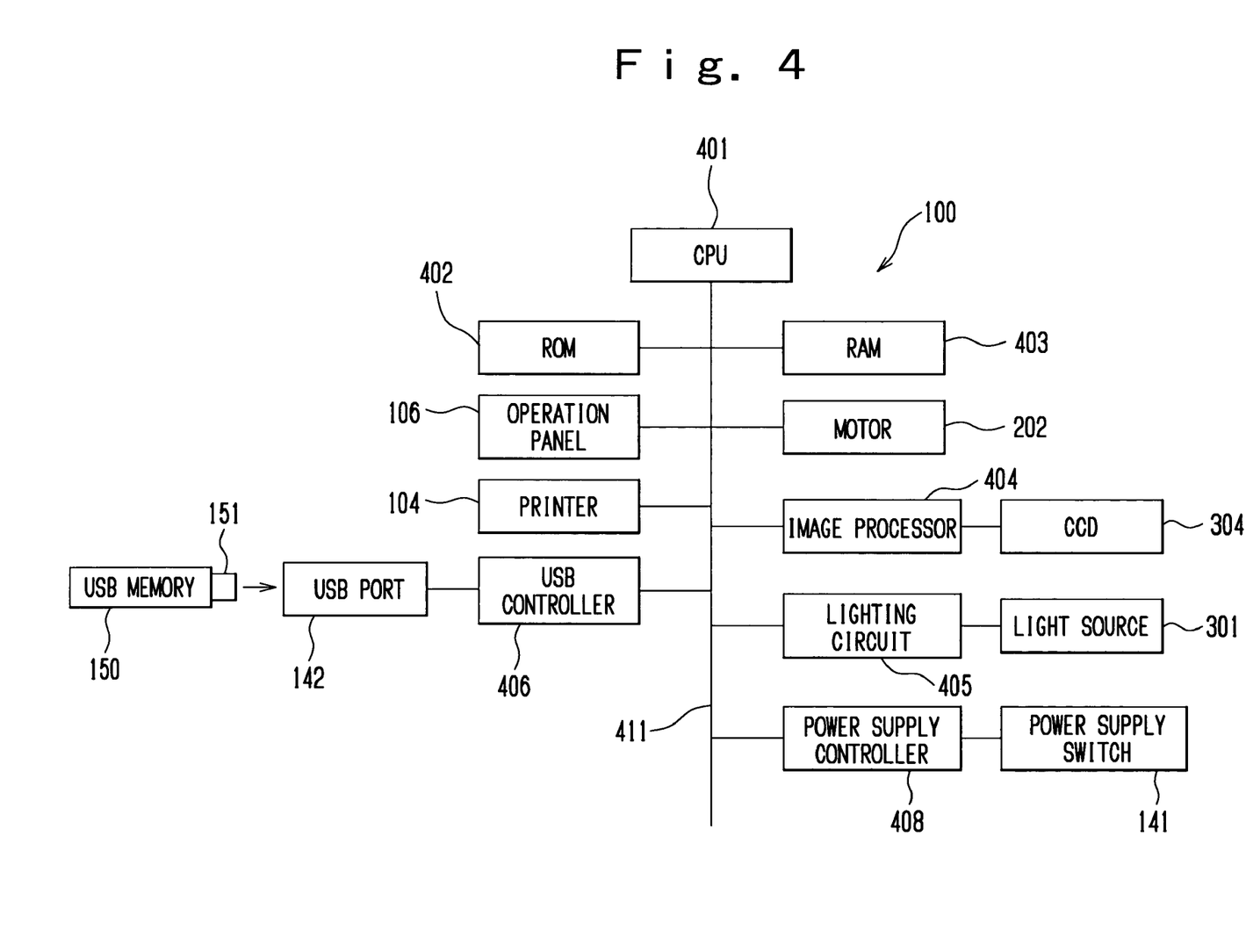
FIG. 4 is a block diagram showing a hardware structure of the blackboard.

FIG. 4 is a block diagram showing a hardware structure of the electronic blackboard. The electronic blackboard 100 has a CPU 401 for controlling various operations. A ROM 402 for storing fixed data such as a controlling program or the like, and a RAM 403 for temporally storing various data and being used as a work area are connected to the CPU 401 via a bus line 411. A printer 104, an operation panel 106, and a motor 202 are connected to the CPU 401 via respective input/output circuits (none are shown) and the bus line 411.

A lighting circuit 405 connected to the light source 301, for controlling a lighting of the light source 301 is connected to the CPU 401 via the bus line 411.

An image processor 404 for converting the drawing data read by the CCD line sensor 304 to printing data (GIF format data, for example) is connected to the CPU 401 via the bus line 411. The image processor 404 is connected to the CCD line sensor 304 and is constituted by various processing circuits, a memory, in which a setting condition which is referred when various processing are executed, is stored (none are shown), or the like.

A USB port 142 is connected to the CPU 401 via a USB controller 406 and the bus line 411.

As shown in FIG. 4, a power supply controller 408 for controlling a power supply device, which provides each part with electric power, is located in the electronic blackboard 100. An on/off operation of the electronic blackboard 100 is executed by an operation of the power supply controller 408 by the power supply switch 141.

With the structure described above, when a certain key 105, which the operation panel 106 has, is pressed, the CPU 401 of the electronic blackboard 100 executes a printing processing of the printer 104 according to an operation program stored in the ROM 402. First of all, the light source 301 is turned on by an operation of the lighting circuit 405, and the motor 202 rotatably drives. Thereby, a light is emitted to the writing surface 103 of the screen 102. Then, the optical system 305 collects a reflection light from the writing surface 103, and the reflected light is received by the CCD line sensor 304 by every line so that a drawing object such as a letter, a diagram or the like drawn on the writing surface 103 is read as drawing data. The read drawing data is converted into printing data by the image processor 404 and stored in the RAM 403. Then, an image based on the printing data stored in the RAM 403 is printed on a paper by a driving control of the printer 104, and the paper is discharged.

Also, when a certain key 105, which the operation panel 106 has, is pressed, drawing data in GIF format, for example, stored in the RAM 403 is transferred from the USB port 142 to a USB memory 150 via the USB controller 406.

Next, the right bottom side corner member 120 where the power supply switch 141 and the USB port 142 are located will be explained.

Figure 5A:
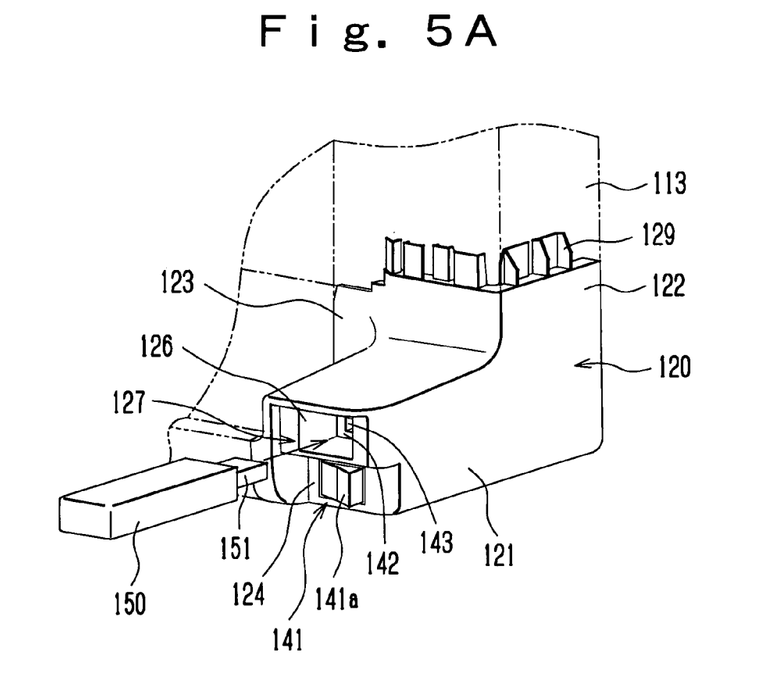
FIG. 5A is a perspective view showing a right bottom side corner member to which a USB memory has not yet been inserted.
Figure 5B:
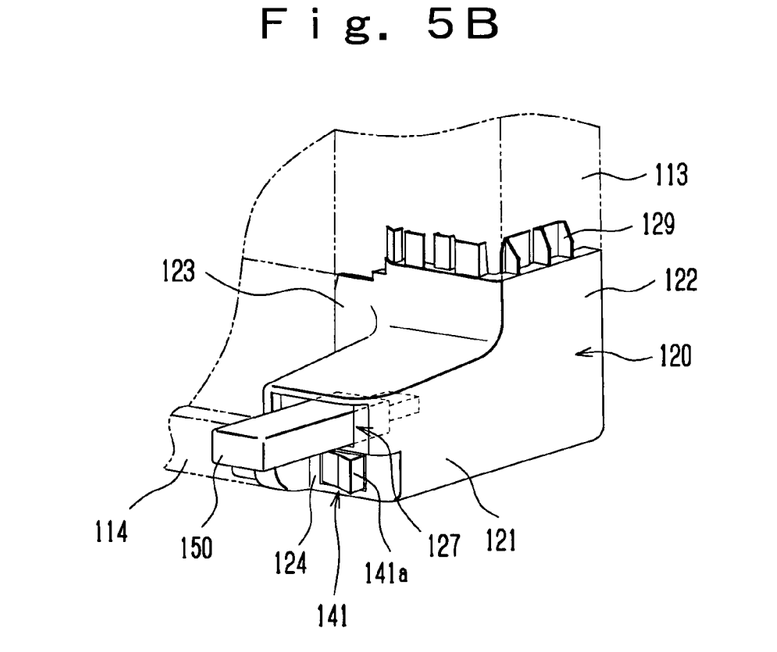
FIG. 5B is a perspective view showing the right bottom side corner member to which the USB memory has been inserted.
Figure 6:
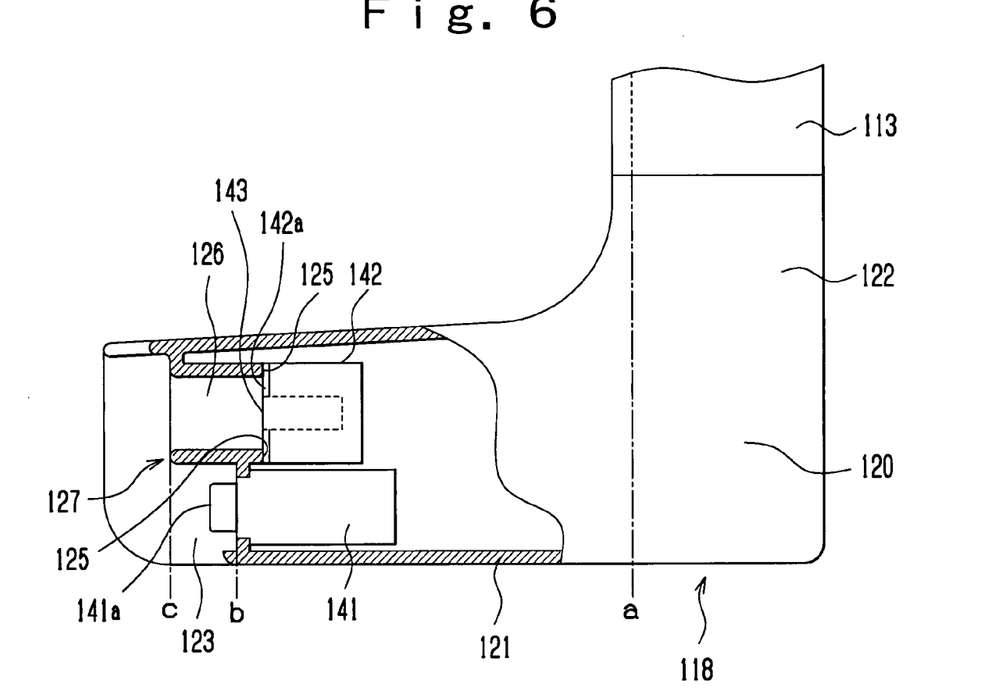
FIG. 6 is a cross sectional view showing the right bottom side corner member with a USB port and a power supply switch.
Figure 7:
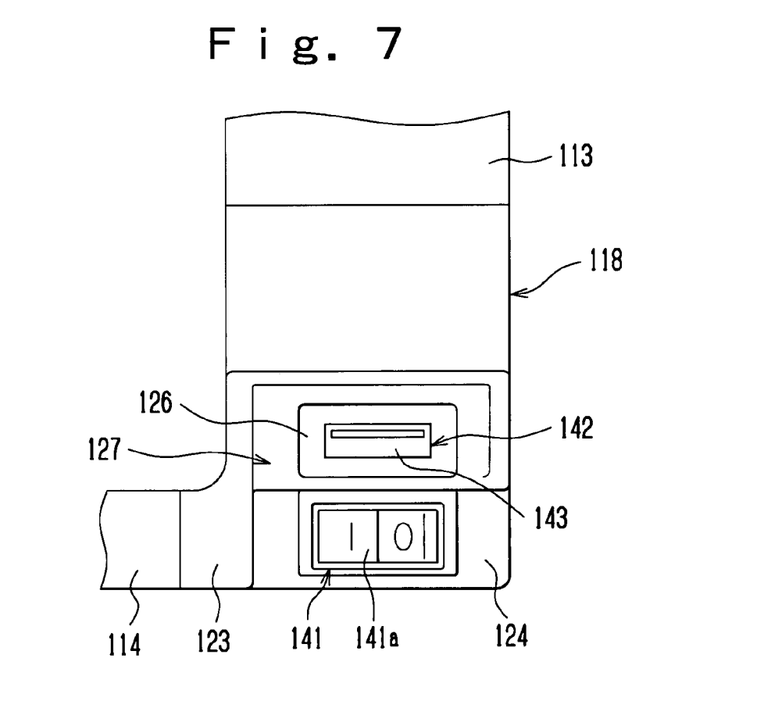
FIG. 7 is a front view showing the right bottom side corner member with a USB port and a power supply switch.

FIG. 5A is a perspective view showing the right bottom side corner member to which a USB memory has not yet been inserted. FIG. 5B is a perspective view showing the right bottom side corner member to which the USB memory has been inserted. FIG. 6 is a cross sectional view showing the right bottom side corner member with a USB port and a power supply switch. FIG. 7 is a front view showing the right bottom side corner member with a USB port and a power supply switch.

The right bottom side corner member 120 is a member integrally formed by a synthetic resin. The power supply switch 141 and the USB port 142 are located at the right bottom side corner member 120. A protruded part 121 is protrudedly formed at a more front position (at an operator side: a left central side in FIG. 6) than the frame 110. An upper connector 122, to which a bottom end of the right side peripheral part 113 is connected, is formed at an upper part of the protruded part 121. A left side connector 123, to which a right end of the bottom platform 114 is connected to, is formed at a left side of the protruded part 121. The numeric mark 129 in the figure shows a protrusion for a connection of the right side peripheral part 113, which is extensionally provided from the left side peripheral part 112.

A power supply switch setting part 124, where the power supply switch 141 is located, is formed at the protruded part 121 of the right bottom side corner member 120. The power supply switch 141 is attached from within the right bottom side corner member 120. The operation part 141*a* of the power supply switch 141 is arranged so as to protrude outwardly from the power supply switch setting part 124. As shown in FIG. 6, a position "b" of an exterior surface of the power supply switch setting part 124 is formed at a more front position (at an operator side: left central side in FIG. 6) than a position "a" of the screen 102.

A USB port setting part 125 where the USB port 142 is located is formed at a right above part of the power supply switch setting part 124. The USB port setting part 125 is formed at a back end part of a protruded peripheral wall 127. An insertion space 126 for surrounding a periphery of a USB memory is formed inside the peripheral wall 127.

The USB port 142 is arranged such that its front end surface 142*a* is connected to the USB port setting part 125, and a terminal insertion hole 143 of the USB port 142 is opened at a back side of the insertion space 126.

As shown in FIG. 6, a position "c" of a front end of the peripheral wall 127 is formed at a more front position (at an operator side: a left central side in FIG. 6) than a position "b" of a surface of the power supply switch setting part 124.

As shown in FIG. 5B, the USB memory 150 is in a status that a connecting terminal 151 is connected to the terminal insertion hole 143 while the connecting terminal 151 is inserted into the insertion space 126.

Accordingly, according to the electronic blackboard 100 of the embodiment of the present invention, the USB port 142 is arranged right above the power supply switch 141 which is operated at a beginning use and a termination of the electronic blackboard 100. Therefore, the USB port of the USB memory is surely recognized at the beginning use of the electronic blackboard 100. Further, at the termination of the electronic blackboard 100, it is prevented that a removal of an external memory device is forgotten.

Further, since the front end of the peripheral wall 127, to which an operator's finger may contact when the USB memory 150 is inserted, is located at a more front position than the power supply switch 141, it can be prevented that the power switch 141 is wrongly operated.

Still further, it can be prevented that an ink scum, which occurs when a drawing object such as a letter, a diagram or the like drawn on the writing surface 103 is erased, enters into the power supply switch 141 or the USB port 142.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic blackboard, comprising:
   a writing medium including a board surface on which a drawing object is executable,
   a reader for reading said drawing object drawn on the writing medium,
   a power supply switch, which is located at a front surface side of the electronic blackboard, for executing an on/off operation of the electronic blackboard, and
   a data port, which is located right above the power supply switch, for outputting read drawing data to a removable exterior storage medium, wherein a protrusion part is formed around the data port so as to extend from an electronic blackboard side toward an operator side to a position farther from the electronic blackboard than a position of an operation part of the power supply switch.

2. The electronic blackboard according to claim 1, wherein a data port setting part where the data port is located is formed at a back end part of the protrusion part.

3. The electronic blackboard according to claim 1, wherein the data port is a USB port and the removable exterior storage is a USB memory.

4. The electronic blackboard according to claim 1, wherein the operation part of the power supply switch is located at the position protruding from the board surface of the writing medium toward the operator side.

5. The electronic blackboard according to claim 4, wherein the power supply switch and the data port are located at a corner member which connects a bottom platform located at a bottom peripheral of the writing medium and a side peripheral part formed at one of side peripherals of the writing medium.

6. The electronic blackboard according to claim 1, wherein the power supply switch and the data port are located at a corner member which connects a bottom platform located at a bottom peripheral of the writing medium and a side peripheral part formed at one of side peripherals of the writing medium.

7. The electronic blackboard according to claim 1, wherein an insertion space is formed inside the protrusion part such that when the removable exterior storage medium is inserted into the data port by a user, the insertion space surrounds a periphery of the removable exterior storage medium.

8. The electronic blackboard according to claim 7, wherein a terminal insertion hole of the data port is opened at a back side of the insertion space.

9. The electronic blackboard according to claim 7, wherein a data port setting part where the data port is located is formed at a back end part of the protrusion part.

10. The electronic blackboard according to claim 1, wherein a front section of the protrusion part, which is touched by a user when the removable exterior storage medium is inserted into the data port by the user, is located at the position farther away from the electronic blackboard than the position of the operation part of the power supply switch such that the power supply switch does not erroneously also get operated by the user.

11. The electronic blackboard according to claim 1, wherein the data port is located adjacent to the power supply switch.

12. The electronic blackboard according to claim 11, wherein the data port is located close to the power supply switch.

13. The electronic blackboard according to claim 1, wherein the data port is formed inside the protrusion part.

14. The electronic blackboard according to claim 1, wherein the power supply switch and the data port are closely located such that when the removable exterior storage medium is in the data port and the power supply switch is operated by a user, the removable exterior storage medium is touchable by the user.

15. An electronic blackboard, comprising:
   a writing medium including a board surface on which a drawing object is executable,
   a reader for reading said drawing object drawn on the writing medium, a power supply switch, which is located at a front surface side of the electronic blackboard, for executing an on/off operation of the electronic blackboard, and a data port, which is located right above the power supply switch, for outputting read drawing data to a removable exterior storage medium, wherein the data port is a USB port and the removable exterior storage medium is a USB memory.

16. The electronic blackboard according to claim 15, wherein the power supply switch and the data port are closely located such that when the removable exterior storage medium is in the data port and the power supply switch is operated by a user, the removable exterior storage medium is touchable by the user.

17. The electronic blackboard according to claim 15, wherein an operation part of the power supply switch is located at a position protruding from the board surface of the writing medium toward an operator side.

18. An electronic blackboard, comprising:

a writing medium including a board surface on which a drawing object is executable, a reader for reading said drawing object drawn on the writing medium, a power supply switch, which is located at a front surface side of the electronic blackboard, for executing an on/off operation of the electronic blackboard, and a data port, which is located right above the power supply switch, for outputting read drawing data to a removable exterior storage medium, wherein the power supply switch is located such that when the removable exterior storage medium is inserted into the data port by a user, the power supply switch is behind the removable exterior storage medium when viewed from a user side.

19. The electronic blackboard according to claim 18, wherein the power supply switch and the data port are closely located such that when the removable exterior storage medium is in the data port and the power supply switch is operated by a user, the removable exterior storage medium is touchable by the user.

20. The electronic blackboard according to claim 18, wherein an operation part of the power supply switch is located at a position protruding from the board surface of the writing medium toward an operator side.

* * * * *